May 5, 1936.  E. W. WEBB  2,039,759
RUBBER SNUBBER SPRING
Filed June 23, 1934
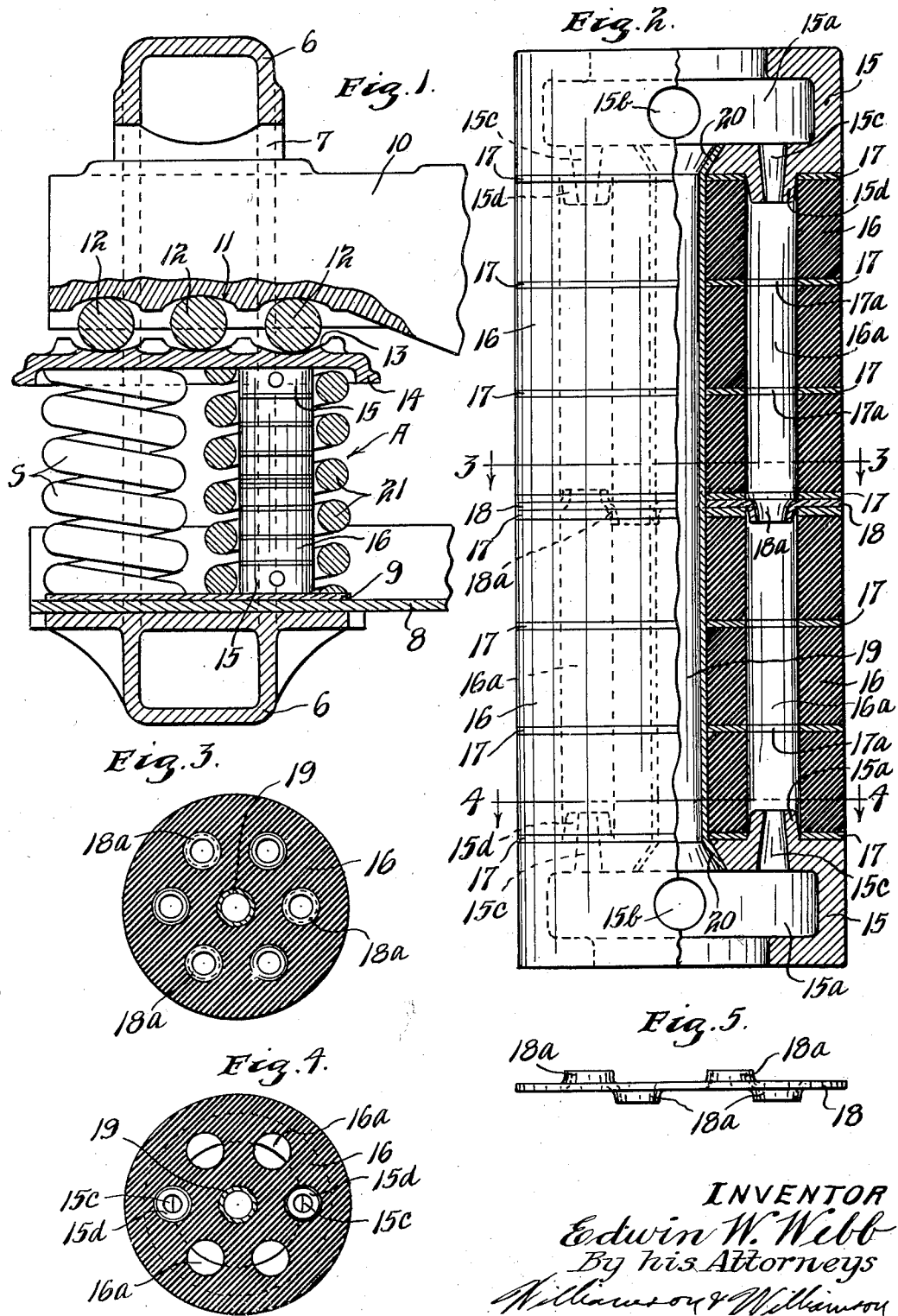
INVENTOR
Edwin W. Webb
By his Attorneys
Williamson & Williamson Patented May 5, 1936

2,039,759

UNITED STATES PATENT OFFICE 2,039,759

RUBBER SNUBBER SPRING

Edwin W. Webb, Chicago, Ill., assignor to Standard Car Truck Company, Chicago, Ill., a corporation of New Jersey Application June 23, 1934, Serial No. 732,099

6 Claims. (Cl. 267—33).

This invention relates to snubber springs which, although capable of different usages, are particularly adapted for use in car trucks.

It is the general object of this invention to provide novel and improved snubber springs of cheap and simple construction and including resilient rubber pads, which snubber springs will have the function of breaking down the natural harmonic action of steel springs that may be used therewith.

Another object is to provide a novel and improved snubber spring including a plurality of rubber pads constructed and arranged to permit of the dissipation of heat from the pads as they are compressed and also permitting the deformation of the pads under compression.

The objects and advantages of the present invention will more fully appear from the following description, made in connection with the accompanying drawing, wherein like reference characters refer to the same or similar parts throughout the various views and, in which, Fig. 1 is a transverse section through a portion of a car truck wherein a snubber spring of the invention is utilized;

Fig. 2 is a view partly in side elevation and partly in vertical section through one of the snubber springs;

Figs. 3 and 4 are respectively transverse sections taken on the lines 3—3 and 4—4 of Fig. 2, as indicated by the arrows; and Fig. 5 is a view in side elevation illustrating one of the parts of the snubber spring.

Referring to the drawing, there are illustrated certain parts of a car truck including the side frame 6 having a lateral opening 7 between the compression and tension members thereof. One end of a spring plank 8 fits within the opening 7 and rests on the tension member of the side frame between the columns defined by the opening 7 and resting on this end of the spring plank is a spring plate 9. One end of a truck bolster 10 extends into the opening 7 and this bolster is provided with roller seats 11 on its under surface receiving the upper parts of lateral motion rollers 12. These lateral motion rollers 12 are received at their lower portions within roller seats 13 formed on a combination spring cap plate and roller seat 14. Interposed between the spring cap plate and roller seat 14 and the plate 9 are a number of coiled springs S which may include single coils as illustrated, or double coils, while also interposed between these same parts is one or more snubber springs A of the invention.

Each snubber spring A includes a pair of caps 15 disposed in oppositely opposed spaced relation and each of these caps is provided with an open topped chamber 15a having communication with the atmosphere through openings 15b in the walls of the cap. Each cap also has openings 15c communicating with the chamber 15a and projecting through inwardly projecting bosses 15d. The caps 15 are preferably of cylindrical shape as shown.

Interposed between the two caps 15 and disposed in alined relation are a plurality of cylindrical-shaped pads 16 composed of rubber having a high load capacity and required resiliency when under load. Circular metal disks 17 are interposed between adjacent pads 16 and also between caps 15 and the pads 16 most closely adjacent thereto. The pads 16 and disks 17 are preferably assembled in groups, two groups being shown in the particular embodiment illustrated. The three upper pads 16 together with the four upper disks 17 compose one group, while the three lower pads 16 and the four lower disks 17 compose the second group. The disks 17 of each group are secured to their adjacent pads 16 as by vulcanizing them thereto. Between the upper and lower group of pads and disks there is interposed a spacing disk 18, this disk bearing upon the lower disk 17 of the upper group and the upper disk 17 of the lower group.

All the various pads 16 and disks 17 have alined central openings therethrough and a tube 19 passes through these openings and also through truncated conical openings in the two caps 15. The ends of this tube 19 are swedged outwardly at 20 to bear against the walls of the truncated conical openings in the caps and thereby limit the extreme movement of the two caps away from each other.

Circumferentially and radially spaced openings 16a are provided in the pads 16 and corresponding openings 17a are provided in the disks 17. The openings 16a and 17a are alined to provide continuous openings through the pad and disk structures and the bosses 15d of the caps 15 are received within the upper portions of these openings so that the openings 15c will communicate therewith. The openings 16a and 17a of the upper group of pads and disks are held in alinement with the similar openings in the lower group of the pads and disks by means of the disk 18 which is provided with up and down turned apertured bosses 18a received respectively within certain of the openings 17a of the lower plate 17 of the upper group and within certain of the openings 17a of the upper plate 17 of the lower group.

Surrounding the structure formed by the caps 15, pads 16, disks 17 and 18 and tube 19 is a coiled compression spring 21 which is interposed between the plate 9 and the spring cap and roller seat 14.

In use, as the snubber spring A is placed under increased compression, the rubber pads 16 will compress and the openings 16a and 17a will afford space for deformation of the pads under compression. Also the heat generated by the compression of the pads 16 may carry off through the openings 16a, 17a, 15c, chambers 15a and openings 15b. The pads 16 will have a different natural harmonic action than the spring 21 and the springs S of the car truck and as the pads 16 must compress as the springs 21 and S compress the natural harmonic action of the springs 21 and S will be broken down, so that the action of these springs will be snubbed. This will stabilize the car truck and give the same much smoother riding qualities than would be the case if the snubber spring or springs of the present invention were not provided in the car truck. As the disks 17 are vulcanized to adjacent pads 16 and as the various openings through the pads and disks are maintained in alinement at all times, there is no danger of the development of frictional heat in the pads to an injurious extent as the pads are compressed.

The snubber device of the present invention is of cheap and simple construction. The caps 15, pads 16, disks 17 and 18 and tube 19 may be installed as a unit in replacement for the inner coil of a standard A. R. A. double coil railway car truck spring.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A snubber spring comprising a pair of caps, a plurality of rubber pads interposed between said caps, metal plates interposed between adjacent pads and attached thereto, said pads, plates and caps having alined openings therethrough for the dissipation of heat, said caps having air passages affording communication between said openings and the air surrounding said caps and a coiled spring encircling said pads and plates.

2. A snubber spring comprising a pair of caps having internal chambers communicating with the exterior surfaces of said caps, a plurality of rubber pads interposed between said two caps, metal plates interposed between adjacent pads and connected thereto, said pads, plates and caps having alined apertures communicating with said chambers of said caps and permitting the dissipation of heat from said pads under compression as well as permitting deformation of said pads.

3. A snubber spring comprising a pair of oppositely opposed cylindrical caps, a plurality of cylindrical rubber pads interposed between said caps, a plurality of circular metal disks interposed between adjacent pads and between said caps and pads most adjacent thereto, said pads and disks having a plurality of alined radially spaced and circumferentially spaced openings therethrough and said caps having air passages extending through their external walls and communicating with said openings.

4. A snubber spring comprising a pair of oppositely opposed caps, a plurality of cylindrical rubber pads interposed between said caps, a plurality of metal plates interposed between adjacent pads and between caps and pads adjacent thereto, said pads and plates having alined openings therethrough permitting the dissipation of heat and deformation of said pads under compression, said caps having air passages through their external walls communicating with said openings and means limiting the spacing between said caps.

5. A snubber spring comprising a pair of oppositely opposed caps, a plurality of rubber pads interposed between said caps, metal disks interposed between adjacent pads and between caps and the pads adjacent thereto, said pads and disks having alined openings therethrough, groups of said pads and disks being vulcanized together, and means interposed between different groups and maintaining the openings in the different groups in alinement, said caps having air passages through their external walls communicating with said openings.

6. The structure defined in claim 5, and a coiled spring surrounding said pads and disks.

EDWIN W. WEBB.